United States Patent [19]

Wittwer et al.

[11] Patent Number: 4,482,386
[45] Date of Patent: Nov. 13, 1984

[54] METHOD OF CONDITIONING A WATER SWELLABLE HYDROCOLLOID

[75] Inventors: Fritz Wittwer, Lupsingen; Ivan Tomka, Bourguillon, both of Switzerland

[73] Assignee: Warner-Lambert Company, Morris Plains, N.J.

[21] Appl. No.: 490,058

[22] Filed: Apr. 29, 1983

Related U.S. Application Data

[62] Division of Ser. No. 362,181, Mar., 1982, abandoned.

[51] Int. Cl.³ .......................... C08F 6/00; C08L 1/08; C09H 3/00; C09D 3/04
[52] U.S. Cl. .................................. 106/135; 106/146; 106/153; 106/208; 106/213; 260/117; 260/118; 523/330; 528/481; 528/483
[58] Field of Search ................. 260/117, 118; 106/125, 106/135, 210, 146, 208, 198, 213; 523/326, 330; 127/32; 528/481, 483

[56] References Cited

U.S. PATENT DOCUMENTS

| | | | |
|---|---|---|---|
| 1,892,599 | 12/1932 | Atherton | 260/117 |
| 2,051,779 | 8/1936 | von Koch | 260/119 |
| 3,137,592 | 6/1964 | Protzman | 127/32 |
| 4,256,771 | 3/1981 | Henderson et al. | 127/32 |

Primary Examiner—Theodore Morris
Attorney, Agent, or Firm—Louis S. Gillow

[57] ABSTRACT

Method to condition water-swellable hydrocolloids for use in mechanical forming processes such as die molding or injection molding. To avoid long conditioning times at high temperature, the hydrocolloids are conditioned to the predetermined water content at ambient temperature and then rapidly heated, just before processing, in a gaseous stream loaded with water to the equilibrium conditions needed to maintain the predetermined water content of the hydrocolloids at the high process temperature of the mechanical forming.

12 Claims, 2 Drawing Figures

METHOD OF CONDITIONING A WATER SWELLABLE HYDROCOLLOID

This is a division of application Ser. No. 362,181 filed Mar. 26, 1982 now abandoned.

BACKGROUND OF THE INVENTION

Field of the invention

To produce shaped articles from organic hydrophilic polymer of high molecular weight such as gelatin or other natural or synthetic water-swellable hydrocolloids by a mechanical forming process such as die molding or injection molding it is often necessary to use process materials at high temperatures in order to obtain the plasticity needed for the mechanical forming process. Plasticity of water-swellable hydrocolloids is not only dependent on the temperature and on the rate of deformation but also on the water content. This latter is generally represented and strictly determined by the absorption isotherm of the process material, which, for each temperature gives the relative humidity of the surrounding gaseous medium which is in equilibrium with a given water content of the process material. Absorption isotherms are characteristic for any given process materials and depend on the chemical structure, molecular weight and degree of crosslinking between the molecules.

The relative humidity of the gaseous environment which is in equilibrium with a given water content of a swellable hydrocolloid is generally high at high temperatures.

Nevertheless, even at higher temperatures, the time needed to arrive at a given equilibrium may be very long, depending on the granularity and specific surface of the process material. For coarse-grained process materials many hours or even days may be needed to reach the equilibrium water content.

Such conditions, i.e. high relative humidity at high temperature may be detrimental for most known hydrocolloids, causing degradation e.g. by hydrolysis and other destructive processes. It is therefore highly desirable to reach the conditions of high temperature at any given water content of the process material in a time as short as possible.

REFERENCE TO COPENDING PATENT APPLICATIONS

Concurrently with this application, please also refer to patent application U.S. Ser. No. 362,177 filed Mar. 26, 1982 and to patent application U.S. Ser. No. 362,430 filed Mar. 26, 1982, both of which are copending with this application.

SUMMARY OF THE INVENTION

It is therefore a primary object of the present invention to drastically shorten the time needed to reach equilibrium conditions between a water-swellable hydrocolloid process material and its gaseous environment at higher temperature, especially at temperatures near the boiling point of water.

It is another object of the present invention to avoid chemical and mechanical degradation of a water-swellable hydrocolloid at conditions of high relative humidity and temperature of its gaseous environment.

It is a further object of the present invention to rapidly raise the temperature of a water-swellable hydrocolloid while maintaining its original water content and thus avoiding the time-consuming process of transfer of water from the gaseous to the solid phase or vice versa.

A still further object of the present invention is to provide an apparatus into which a conditioned hydrocolloid of predetermined water content is fed at a constant rate and at a low temperature, preferably at ambient temperature, and is removed from at the same constant rate at a higher temperature but with the same predetermined water content.

DESCRIPTION OF THE METHOD OF THE INVENTION

Figure 2:
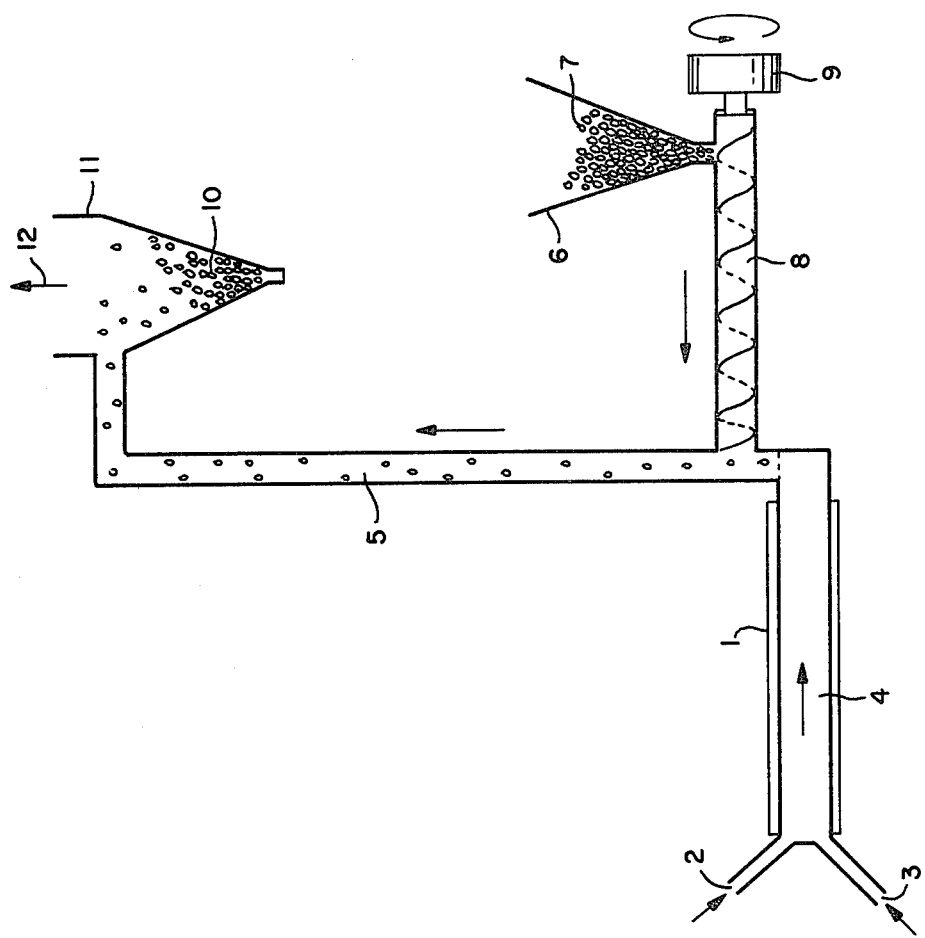
FIG. 2 is a schematic representation of an apparatus with which the process of the present invention can be practiced.

The objects of the invention as defined above can be realized by first conditioning the water-swellable hydrocolloid to the desired water content at low, preferably ambient, temperature, then feeding it into a gaseous stream having a temperature range from 70° to 100° C. at ambient pressure of said gas, or having a temperature range from 100° to 170° C. at a pressure of 8000 Newton $\times m^{-2}$ of said gas, which gaseous stream has been loaded with a quantity of water to give the relative humidity which, at the desired higher end temperature of the product, is in equilibrium with the predetermined water content of the hydrocolloid as fed into the gaseous stream at low temperature, and finally separating the hydrocolloid from the gaseous stream and removing the heated hydrocolloid with its water content virtually unchanged and ready for immediate use in a molding process. A typical water-swellable hydrophilic polymer is gelatin, but the process of the present invention can also be used for other proteins of convenient properties, such as casein, soya bean protein or safflower protein or by other natural, modified natural or synthetic hydrophilic polymer such as phthalated gelatin, succinated gelatin, cellulosephthalate-acetate, polyvinylacetate, polyvinylacetate-phthalate, polymerisates of acrylic or methacrylic esters modified by hydrophilic groups to render them water-swellable, or any other water-swellable hydrophilic polymer known to those skilled in the art.

The hydrophilic polymer may be mixed or completely substituted with extenders, such as starch, amylose, lactose, gum arabic, etc., and/or modified by crosslinking agents such as salts or tri or tetravalent metals, aldehydes, dialdehydes, halogenated aldehydes, mucochloric acid, 1,1- and 1-4 diketones, quinones, acid anhydrides, vinylsulfones, acrylamides, products with 3-membered rings such as ethyleneoxide or ethyleneimine, carbamoylonium compounds, etc.

By such crosslinking agents the thermomechanical properties necessary for the molding process and the water-swellability can be varied within wide limits.

The hydrocolloids are preferably used in granular form, in order to be easily manipulated by common feeding devices and to facilitate their transport within the gaseous stream and the exchange of heat with the latter.

The conditioning of the hydrocolloid to the desired water content may be put into effect by any known method such as storing in a climatized chamber with or without forced circulation of air. To obtain higher contents of water, a more rapid process is to add the needed quantity of water to the granulated product in a mixer, mix until the soaked granules feel superficially dry and do not stick together, and then store the mixture in a closed container. This will allow for an even distribution of water within the granules and through the bulk of the process material. For most of the known feeding and metering methods it will be advantageous if the conditioned process material is free-flowing. A breaking or milling and/or sieving process may be used when the conditioned process material has become caky by storing.

For feeding and metering the conditioned process material into the gaseous stream, any known device which is suitable for granulated or powdery material may be used. Convenient devices are feeding screws or devices which transport the material along the inner circumference of a cylindrical barrel such as a toothed wheel or a wheel with radially arranged vanes.

The gaseous stream will normally be air but, if necessary, can also be an inert gas which will not react with the material. To load the gaseous stream with water, this may be injected as a fine spray or in the form of steam from a steam generator. The gaseous stream will normally be heated to the desired end temperature at a point upstream from the humidifying device. Temperature corrections may have to be provided for to compensate for heat loss by evaporation of sprayed water or heat excess by introduction of steam.

Figure 1:
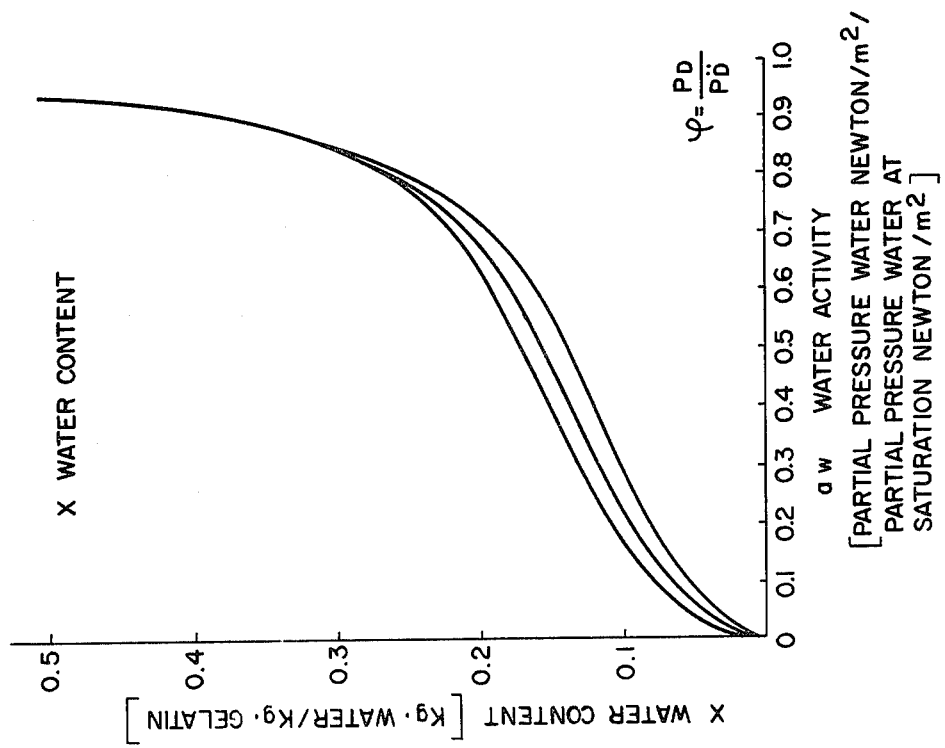
FIG. 1 is a schematic diagram showing the absorption isotherm of gelatin.

FIG. 1 is a schematic diagram showing the absorption isotherm of gelatin, which is a typical hydrocolloid, for which the method of the present invention may be used. FIG. 1 shows, in the abcissa, the thermodynamic water activity of a gaseous atmosphere which is in equilibrium with solid gelatin of a given water content as indicated on the ordinate. The different curves represent different temperatures. It can be seen, that at high temperatures near the boiling point of water the water load of the gaseous atmosphere for any given water content of the gelatin rises very steeply. This is not only because the relative humidity of the gaseous environment must be higher at higher temperatures, but also because the absolute water load for a given relative humidity increases strongly with rising temperatures, especially near the boiling point of water.

Referring now to FIG. 2, which is a schematic representation of an apparatus with which the process of the present invention can be put into effect: The humidified gaseous phase is flowing through the heating tube with the heating mantle 4 after having been mixed from dry gas, e.g. dry air, entering through tube 2 and steam or sprayed water, entering through tube 3. Reaching the end of the heating tube 1, the gas-steam mixture will have reached the desired end temperature as calculated by common thermodynamic engineering methods, given the desired quantity and end temperature of the hydrocolloid. At this point the humidified gas stream is turned to the vertical, entering the vertical tube 5. At the bottom of tube 5, the granulated hydrocolloid 7 is fed from the hopper 6 through the spiral feeder 8 at a constant rate which is determined by the rotation of the motor 9. The granules are carried upwards in tube 5 by the gas stream, whereby heat is transferred from the gas stream to the granules. Length and diameter of the tube 5 have to be calculated so that the velocity of the gas stream is sufficient to carry the granules and that the residence time is sufficient to heat the granules to the desired end temperature. These dimensions can be calculated by common engineering methods, given the diameter, density, specific heat and heat conduction characteristics of the granulated hydrocolloid. Having reached the desired end temperature, the granules 10 fall into the hopper 11 of an extruder unit and this unit may be coupled with a molding unit. Said molding unit may be part of an injection molding machine, a blow molding machine, by effect of the reduced gas stream velocity, whereas the gas stream escapes through vent 12.

The present invention utilizes gelatin preferably made from various types of gelatin, including acid or alkaline processed ossein, acid processed pigskin, or alkaline processed cattle hide.

Other arrangements may be chosen to reach the same effect, always provided, that the residence time of the granules in the gaseous stream is just sufficient to allow for the desired heat exchange but by no means any substantial transfer of humidity between the granules and the gaseous phase may take place.

Having now described the method and a device with which the invention can be put into effect, the conditions by which the invention can be realized will be illustrated by the following example.

EXAMPLE

In an apparatus according to FIG. 2, described above. The length of the heating tube 1 is 5 meters. Through tube 2 20 kg/hr of ambient air are blown in by a blower not shown in FIG. 2. At the same time 40 kg/hr of saturated steam are injected through tube 3. At the end of tube 1, by heating through the heating mantle 4, the temperature of the air-steam mixture will have reached a temperature of 102° C. At ambient pressure any condensation of water will thus be avoided.

Into the vertical tube 5 of diameter 4 cm and length 100 cm feed 10 kg/hr of gelatin granules, bone gelatin having the following molecular mass mean values:
Number average: 57000Dalton
Viscosity average: 155000Dalton
Weight average: 258000Dalton
Centrifuge average: 5130000Dalton
molecular mass of largest molecules: $10^7$Dalton.
Said gelatin conditioned to a water content of 15% b.w. by the spiral feeder 8, driven by the motor 9.

The gelatin granules have a mean diameter of 0.2 cm, a density of 1,360 kg $\times m^{-3}$, a specific heat of 0.4 to 0.66 cal/g. ° C. at the temperature range of 2 to 160° C.; the heat conductivity within the granules is 0.23 kcal/m.hr ° C. The granules will be taken upwards by the gaseous stream with a velocity of 0,1 m/sec; the residence time in the vertical tube 5 will therefore be 10 sec.

When the gelatin granules have reached the upper end of the tube 5 and are discharged into the hopper 11 then will have reached a temperature of 100° C. at the surface and a temperature of 86° C. at the center, with their water content of 15% b.w. virtually unchanged. 292 kcal/hr of heat are required for the whole operation. The air, still containing the entire humidity, added as steam, leaves through vent 12 and may be recirculated.

While there have now been described and illustrated several embodiments, the scope and working range of the present invention shall not be limited by the given examples. The invention comprises as well various changes and modifications which will occur to those skilled in the art.

It is intended in the appended claims to cover all such changes and modifications as fall within the true spirit and scope of the present invention.

What we claim is:

1. A method by which a water-swellable hydrocolloid, for use in mechanical forming processes is conditioned to a given water content and is rapidly heated from a lower temperature to a higher temperature without virtually changing its water content, characterized by
   (a) slowly conditioning the hydrocolloid at the lower temperature to obtain an even distribution of water within every particle and through the bulk of the hydrocolloid,
   (b) transferring the hydrocolloid into a gaseous atmosphere of the desired higher temperature, said gaseous atmosphere is loaded with water to the proportion in equilibrium at the higher temperature with the predetermined water content of the hydrocolloid, and
   (c) removing the hydrocolloid from the said gaseous atmosphere within a short time sufficient to heat the hydrocolloid to the desired higher temperature but not sufficient to affect any substantial exchange of humidity.

2. The method of claim 1 wherein the lower temperature is normal ambient temperature and the higher temperature is near the boiling point of water.

3. The method of claims 1 or 2, wherein the hydrocolloid has a glass-transition point above the lower temperature and below the higher temperature as defined in claim 1 and is able to be plastically deformed at the higher temperature.

4. The method of claims 1 or 2, wherein the hydrocolloid is a plastifiable protein.

5. The method as in any claims 1, 2, 4 or 6 wherein the plastifiable

6. The method of claim 5, wherein the gelatin is in granulated form with a mean particle size between 0,2 and 4 mm.

7. The method of claims 1 to 6, wherein the gaseous atmosphere loaded with water is a gas stream preferably an air stream, of constant velocity, into which the hydrocolloid is fed at a constant rate at a first point, carried away with the gas stream, and removed from the gas stream at a second point after a predetermined elapsed time.

8. The method of claim 7 wherein the gas stream is an air stream.

9. The water-swellable hydrocolloid produced by the method of claim 1 for the feeding of die molding or injection molding machines.

10. The method of claims 1 or 2 wherein the hydrocolloid is a natural hydrophilic polymer selected from a group consisting of casein, soya bean protein, or safflower protein.

11. The method of claims 1 or 2 wherein the hydrocolloid is a modified natural hydrophilic polymer selected from a group consisting of phthalated gelatin and succinated gelatin.

12. The method of claims 1 or 2 wherein the hudrocolloid is a synthetic hydrophilic polymer selected from a group consisting of cellulosephthalate-acetate, polyvinylacetate, polyvinylacetate-phthalate, and polymerisates of acrylic or methacrylic esters modified by hydrophilic groups to render them water-swellable.

* * * * *